United States Patent [19]

Nisley et al.

[11] Patent Number: 4,832,511
[45] Date of Patent: May 23, 1989

[54] HIGH EFFICIENCY SEAL DEVICES FOR SHAFT BEARINGS

[75] Inventors: Donald L. Nisley, Greenville; Howard M. Martinie, Simpsonville, both of S.C.

[73] Assignee: Reliance Electric Company, Greenville, S.C.

[21] Appl. No.: 232,673

[22] Filed: Aug. 16, 1988

[51] Int. Cl.⁴ ............................................. F16C 33/78
[52] U.S. Cl. .................................... 384/480; 384/478; 384/482; 277/95
[58] Field of Search ............... 384/480, 482, 140, 478, 384/135, 144; 277/95, 53, 54

[56] References Cited

U.S. PATENT DOCUMENTS

| | | | |
|---|---|---|---|
| 3,656,824 | 4/1972 | Ullberg | 384/482 |
| 4,348,067 | 9/1982 | Tooley | 384/480 |
| 4,763,904 | 8/1988 | Martinie | 277/95 |
| 4,776,709 | 10/1988 | Tooley | 384/482 |

Primary Examiner—Lenard A. Footland
Attorney, Agent, or Firm—Dority & Manning

[57] ABSTRACT

A seal system for a bearing having a housing with a chamber therein for receiving a shaft supported by a bearing assembly therein. The sealing system includes three and preferably four seal devices integrally related by means of a seal ring detachably retained within an exterior chamber of the housing. One of the seal devices is in the form a V-ring which has its flexible lip held in sealing engagement with a surface of the housing by the positioning of the ring in its operating condition. Another seal device in the form of a quad-ring, O-ring or the like is mounted in a groove in the ring and is held tightly fixed upon the shaft. The rotation of the seal ring provides a third seal device by being adapted to fling moisture and contaminants which may run along the shaft during rotation thereof. The fourth seal device is in the form of a labyrinth seal between a wall of the seal ring and a cooperating wall of the bearing housing. Each of the four seal devices provides a specific sealing characteristic and usefulness which combine to provide high efficiency sealing for large bearings allowing for extreme bearing misalignment.

12 Claims, 2 Drawing Sheets

HIGH EFFICIENCY SEAL DEVICES FOR SHAFT BEARINGS

BACKGROUND OF THE INVENTION

The invention relates generally to seal devices and, more particularly, to sealing devices in combinations for use in shaft bearings.

In conventional shaft bearings such as pillow blocks and similar large size shaft bearings, it is a common practice to seal the bearings between the shaft and its supporting housing with a labyrinth-type seal which, when properly lubricated, performs rather effectively to exclude foreign matter and which permits a purging action to take place to expel dirt and moisture from the inner chamber of the bearing housing while the bearing is in operation and/or while the bearing is being lubricated.

A labyrinth seal normally comprises two or more interrelated annular grooves and ribs formed on a shaft and in the adjacent surfaces of the housing. While this type of seal is fairly effective for small bearings, such type of seal often fails to perform satisfactorily for large bearings in that the lubricant injected in the housing usually settles into a sump or recess in the bottom of the housing. This settling of the lubricant prevents the filling of the annular grooves in the seal thus permitting the free flow of moisture and abrasive matter through the seal and into the bearing housing. In addition, since the lubricant from the housing fails to fill the grooves of the seal, effective purging operations to remove dirt from the seal are not possible.

In an effort to prevent the ingress of moisture and foreign matter into the bearing housing in large bearings, a structurally independent auxiliary seal is sometimes used externally of the labyrinth seal. The auxiliary seal is usually a V-ring type mounted on and rotatable with the shaft. As known in the art, the V-ring type is formed with a flexible lip adapted to seat on an annular radial surface of the housing. This type of seal, however, is not fully effective in that as the shaft moves endwise during operation, the lip may become fully displaced from the radial sealing surface, thereby providing a space through which moisture and dirt can reach and pass through the labyrinth seal.

In the prior art there are a number of variations to known sealing devices disclosed which attempt to correct one or more disadvantages inherent in such devices for use in shaft bearings. In U.S. Pat. No. 4,575,265, assigned to the same assignee as is the present application, a V-ring type seal is disclosed as having a lip in sealing contact with the surface of a separate ring attached to the inner surface of the bearing housing. The V-ring seal is mounted directly on the inner race for the bearing for rotation therewith and does not provide a sealing relationship with the shaft supported by the bearing.

In U.S. Pat. No. 4,153,259, a V-ring seal is utilized in a manner in which it is tightly placed upon a sleeve which, in turn, is supported on a shaft. The seal includes a lip portion in sealing engagement with a wall surface of the bearing housing. Auxiliary sealing rings are also utilized in conjunction with the V-ring seal but these are also mounted upon the same sleeve. This arrangement experiences disadvantages which result when there is no positive sealing engagement with the shaft, and when there is no interaction between the seal devices.

In U.S. Pat. No. 4,106,781, a press-fitted cylindrical wear sleeve formed to contain a complex V-ring type seal having multiple sealing lips is adapted to be inserted into the annular opening in a bearing thereby permitting the simple installation of the sealing device. The disadvantage in the use of this type of seal device is that the cylinder itself may be the source of movement of contaminants into the bearings.

The use of a V-ring seal which also forms a simple labyrinth seal is disclosed in U.S. Pat. No. 4,054,335. The V-ring seal is not directly contacting the supported shaft and the device which is utilized as a labyrinth seal comprises a synthetic material. The lip for the V-ring seal is in sealing engagement with a flexible ring thus presenting an environment wherein elevated temperatures produced during the operation of the bearing may effect different expansion characteristics to the flexible ring and labyrinth seal which, in turn, may affect the sealing capabilities of these elements.

In the U.S. Pat. Nos. 3,994,545, 3,858,950, and 3,504,917 and the Australian Pat. No. 153,472, various shapes of flexible sealing devices are disclosed which utilize sealing lips engageable with surfaces provided in the bearings to be sealed.

None of the patents discussed above disclose multiple sealing connections or relationships whereby the different and unique characteristic of each sealing device can be integrated so that high efficiency is attained in sealing a shaft bearing. In the present invention, it is recognized that each specific type of sealing device has a unique characteristic of its own which offers an advantage not inherent in other types of sealing devices so that when a variety of different sealing characteristics are combined, optimum performance of sealing is possible. For very large shaft bearings or those which experience wide vibrations and shaft displacements coupled with extreme variations in temperature during shaft rotation within the bearing, and for use in environments having high humidities and aerial contaminants, there is the need to bring together all of the specific advantages that each type of sealing characteristic provides.

The present invention brings together at least three and preferably four sealing characteristics, each of which contributes to the combined effect of all to produce a high efficiency, improved sealing arrangement for a shaft bearing. The high efficiency seal system of the present invention combines at least a dynamic face rubbing lip seal, a static shaft seal and a flinger seal, and preferably also a labyrinth seal. With this arrangement, the sealing system takes advantage of all of the seal types to form a sealing system which has very large misalignment capability but still provides superior sealing protection against dirt and moisture.

The present sealing system includes a V-ring seal tightly mounted on a shaft to form a positive static seal along the shaft, the V-ring having a lip which is arranged to contact a radially oriented smooth surface such as a portion of the bearing housing, thereby providing a dynamic contact seal as the lip rubs on the housing surface during rotation of the shaft. The sealing system also includes a seal ring into which a quad-ring, o-ring or the like seal is installed for supporting the seal ring, the quad-ring seal serving as a secondary static shaft seal. The quad-ring is tight on the shaft and rotates therewith as does the seal ring. With the seal ring riding on the quad-ring, the same will rotate with the shaft and serves as a flinger seal thereby helping to direct contaminants away from the shaft and ring seal. The specific structures for the seal devices are interrelated, and cooperate to provide optimum efficiency while utilizing a minimum of parts and in an arrangement which permits easy and simply installation.

It is therefore one of the principle objects of the present invention to seal a shaft in a bearing in a manner which permits the effective purging action of the bearing during operation and lubrication and yet which positively seals the bearing from the ingress of foreign material, both during operation and during cooling of the bearing when it becomes inoperative.

Another object of the invention is to utilize a seal system which provides a plurality of sealing characteristics or types in combination between the shaft and the internal structure of the shaft bearing, which permits the flow of lubricant, dirt and moisture outwardly from the bearing structure and yet prevents the ingress of dirt and moisture into the bearing structure.

A further object of the invention is to seal a bearing utilizing structure which are relatively simple in construction and operation and which result in little or no wear between moving parts and hence provide a long, trouble-free lift with little or no servicing or other intention to maintain the seal in optimum operating condition.

Still another object of the invention is to provide a seal for shaft bearings which is particularly adapted for large bearings, and which functions effectively irrespective of the large displacement and vibrations during operations of the bearing.

Other objects and advantages of the present invention will become apparent from the foregoing description taken in conjunction with the accompanying drawings wherein:

DESCRIPTION OF A PREFERRED EMBODIMENT

Figure 1:
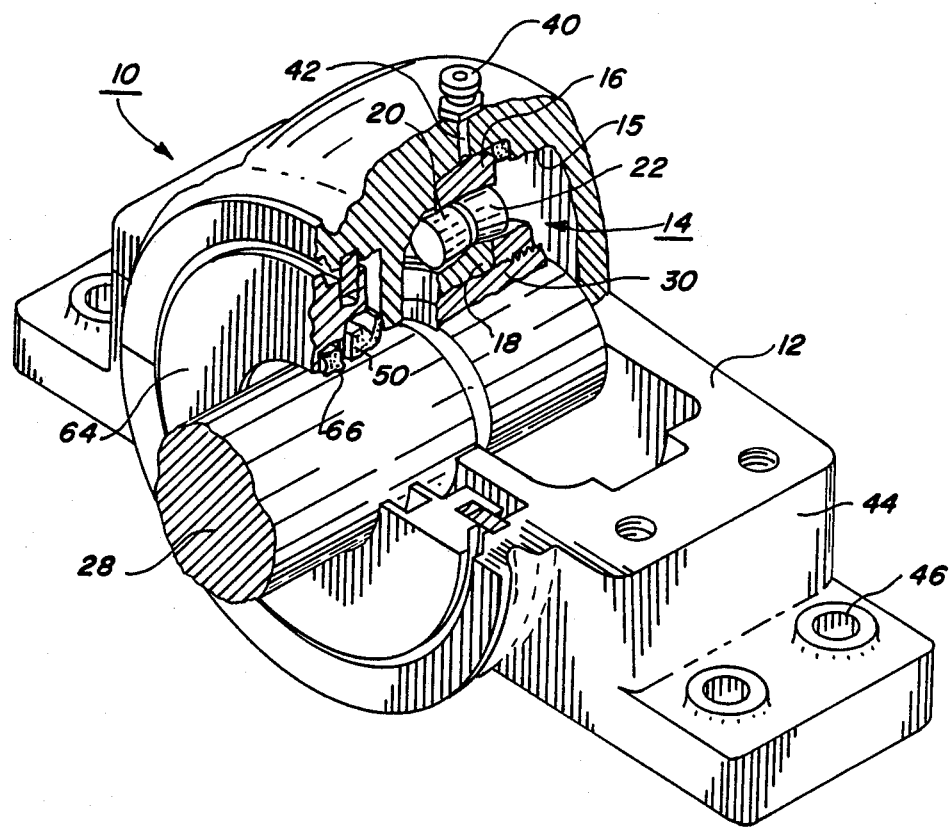
FIG. 1 is a perspective view of a bearing such as a pillow block and shaft with a portion of the housing and pillow block being broken away to show more effectively the seals therein.

Referring more specifically to the drawings and to FIG. 1 in particular, numeral 10 indicates generally a pillow block having a housing 12 and a bearing assembly 14 mounted in the chamber 15 of the pillow block and supported by the housing. For purposes of the present invention, the bearing assembly may be considered as conventional consisting generally of an outer race 16, an inner race 18 and two rows of roller bearings 20 and 22, with the roller bearings being held in place between the outer and inner races by cages (not shown).

Figure 2:
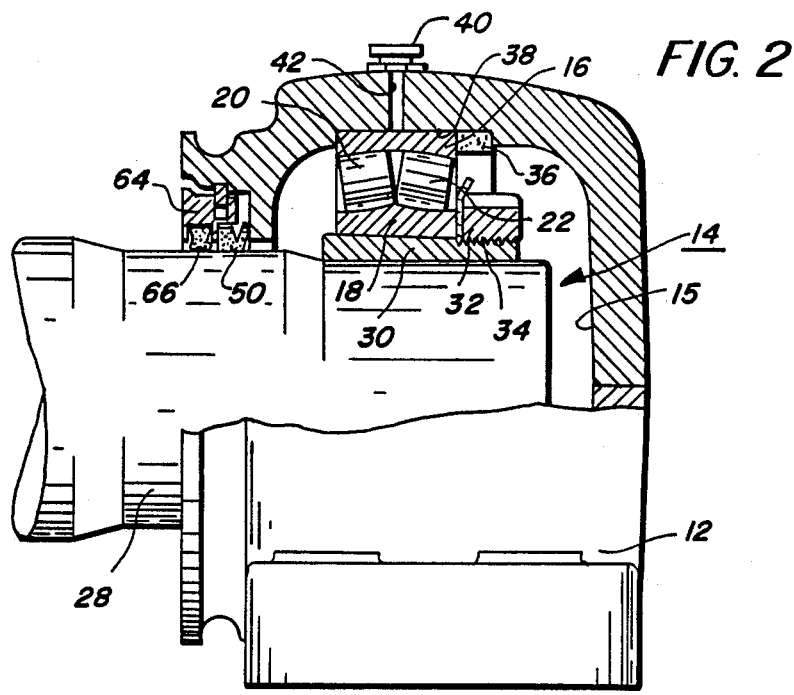
FIG. 2 is a cross-sectional view of the pillow block shown in FIG. 1.

When the bearing assembly is installed, a shaft 28 extends through a tapered bearing sleeve 30 upon which the inner race 18 is securely fastened. The shaft 28 normally extends completely through the bearing sleeve 30 and therefore through the planes of the inner and outer races 16, 18. The inner race 18 and, consequently the entire bearing assembly 14, is retained firmly in place on the sleeve 30 by a locknut 32 threadably secured upon a threaded exterior surface 34 of the sleeve 30. As shown in FIG. 2, the outer circumferential surface of the sleeve 30 tapers outwardly, whereby tightening of the locknut 32 upon the threads of the portion 34 wedges the inner race 18 in tight engagement with the sleeve 30.

The bearing assembly 14 is also held in operating positio within the pillow block by a bearing spacer 36 disposed at one end of an annular groove 38 formed in the interior wall of the housing 12. The spacer 36 abuts the outer race 16 and holds the same against the other end of the groove 38. Lubrication is applied to the bearing assembly through a suitable lubrication fixture 40 mounted in a threaded bore 42 in the upper portion of the housing 12. The housing 12 is provided with a base 44 containing suitable openings 46 on either side thereof for securing the pillow block on a supporting structure. While the present invention is particularly adapted for use in large bearings, such as the pillow block described herein, the invention is applicable to various other types and sizes of bearings.

The sealing devices which embody the sealing system of the present invention are disposed on one side of the bearing assembly since the environment for the present invention is shown and described in relation to a particular pillow block. It will be understood that the sealing system of the present invention may be applied to opposite sides of a bearing assembly for other types and sizes of bearings.

Figure 3:
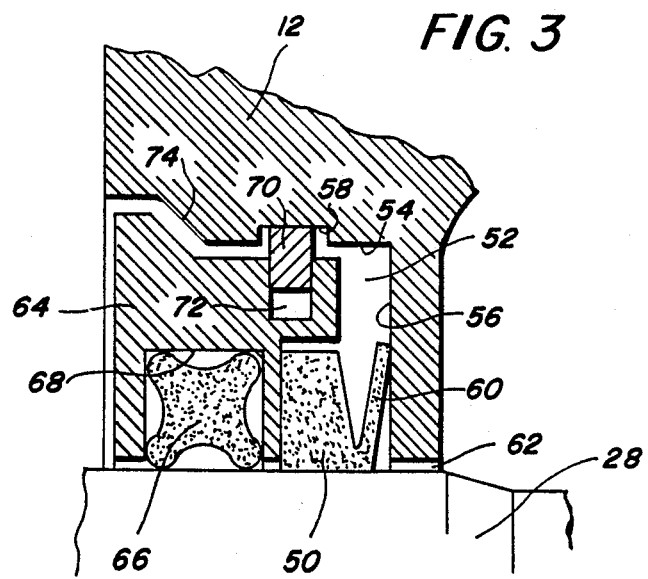
FIG. 3 is an enlarged fragmentary cross-sectional view of the pillow block and illustrating the sealing system of the present invention.

The first seal device of the sealing system comprises a V-ring seal 50 made from elastomeric material tightly mounted on the shaft 28 within a annular opening 52 formed at one side of the bearing housing 12. As shown in FIG. 3, the chamber 52 is formed with a circumferential wall 54 concentric with the axis of the shaft 28 and an annular wall surface 56 extending radially relative to the shaft. An annular groove 58 is formed in the wall 54 approximately midway of its depth within the housing 12.

The V-ring seal 50 includes a flexible lip 60 extending laterally inwardly and seating on the external wall 56 of the housing throughout its full circumference. With the V-ring seal seating tightly on the outer surface of the shaft 28 when in operating position, lip 60 is in proper contact with the surface 56 whereby an effective lubricant seal is created and maintained with the bearing assembly 14 and the outer sealing chamber 52. While preferably surface 56 is an integral part of the housing, it could be an annular ring or the like installed in a portion of the housing. With the V-ring seal tightly mounted on the shaft, a positive static seal along the shaft is established thus producing no shaft wear which could result in a stress riser on the shaft. A stress riser could cause shaft failure under load and could lead to replacement of the shaft.

The wall surface 56 and the structure of the housing 12 supporting the same is spaced from the outer circumferential surface of the shaft thereby providing an annular opening 62 through which lubricant may flow when the pillow block is lubricated, and further permitting the internal pressure of the bearing created by heat to be relieved by the passage of air and lubricant through the opening 62 and past the lip 60.

Other seal devices of the sealing system of the present invention are associated with a seal ring 64 which encircles the shaft 28 and is retained within the opening 52 when in operating position. The seal ring includes a second seal device of the sealing system of the present invention, which seal device is illustrated in the form of a quad-ring 66 retained within an annular groove 68 formed in the seal ring and which is tightly mounted on the shaft 28. The quad-ring seal 66 supports the seal ring and acts as a secondary static shaft seal for the pillow block 10. By being tightly mounted on the shaft, the quad-ring seal rotates therewith and thereby does not cause shaft wear. This mounting also induces rotation to the seal ring 64 which serves as a flinger seal to direct contaminants away from the shaft during rotation thereof. This third sealing characteristic prevents water or other fluids which run along the shaft from entering the housing seal area. Water or other fluids are deflected to the seal ring face which acts as a flinger to direct them away from the pillow block.

The seal ring 64 is held in its operating position within the opening 52 by means of a retaining ring 70 held within a groove 72 formed in the outer wall of the ring 64 and cooperable with the groove 58 formed in the wall 54 of the housing 14. When in its operating position, the ring 64 abuts and forces the V-ring seal 50 inwardly to produce flexing of the lip 60 for its sealing engagement with the wall 56. When the retaining ring 70 is in its operating position as shown in FIG. 2, a labyrinth seal is established between the housing/retaining ring and the seal ring 64. The retaining ring is similar in construction to a snap ring, and as the seal ring 64 is pushed into the opening 52, a tapered angle 74 formed in the wall 54 compresses the retaining ring until it snaps into the housing groove 58. In this arrangement, the retaining ring holds the sealing system in position to provide proper lip compression of the V-ring lip 60 against the housing surface 56.

From the foregoing, it will be understood that the high efficiency sealing system of the present invention is the result of a unique, integrated combination of a labyrinth seal, a dynamic face rubbing lip seal, a flinger seal, and a static shaft seal at two positions on the shaft. In this combination, the sealing system takes advantage of all the desirable characteristics of four types of seal devices thereby providing a capability for large shaft misalignment and superior sealing protection against dirt and moisture. The sealing system takes the advantage of a labyrinth seal between the housing/retaining ring and the seal ring when in operating position. The housing and retaining ring form one surface of the labyrinth while the seal ring forms the other surface of the labyrinth. Grease that purges from the housing opening through the V-ring seal lip 60 flows through the labyrinth seal formed between the seal ring and the retaining ring housing assembly, thereby purging lubricant through the labyrinth to remove dirt and contaminants.

As previously stated, the sealing system of the present invention structurally integrates four different types of seal devices: the labyrinth seal between the housing and seal ring, dynamic rubbing lip seal on a housing surface, static shaft seals from the quad-ring and V-ring due to tight mounting on the shaft, and a flinger seal formed with a seal ring which rotates with the shaft to deflect contaminants away from the housing. The sealing system can be easily installed on a shaft while supported on a bearing block without external press fits or snap rings on the shaft. It will also be appreciated that the present sealing system includes a seal ring which can be installed easily into a pillow block housing while the pillow is mounted on the shaft.

While only a single embodiment of the present invention has been described herein, it will be obvious that various other embodiments and modifications may be made without departing from the scope of the invention.

What is claimed is:

1. A sealing system for a bearing having a housing with an interior chamber therein for receiving a shaft, a bearing assembly arranged in the housing and having outer and inner races extending axially relative to the shaft within the chamber, a plurality of rotatable bearing elements between the races, the housing being formed with an annular surface extending radially inwardly toward the shaft, the sealing system comprising an annular sealing means in the form of a V-ring mounted directly on and in sealing relationship with the shaft externally of the annular surface of the housing, said V-ring having an annular lip extending generally radially outwardly and seating on an annular surface for permitting egress of lubricant from the bearing assembly during purging of the assembly and to prevent ingress of foreign matter into the bearing assembly, a seal ring disposed on the shaft outwardly of the annular surface being arranged when in operating position to engage said V-ring and to maintain the same whereby said lip is in sealing contact with the annular surface, and means for detachably retaining said seal ring in said operating position, said seal ring including a sealing member mounted directly on and in static sealing relationship with the shaft outwardly of said V-ring, said seal ring, sealing member and V-ring thereby being rotatable with the shaft and relative to the housing.

2. The sealing system defined in claim 1 wherein said sealing member is of the quad-ring type retained in a groove formed in said seal ring.

3. The sealing system defined in claim 1 wherein said seal ring is adapted to be moved axially along the shaft when not in said operating position and to be retained within an annular opening within the housing, and wherein said retaining means includes a snap ring device engagable with a wall of said annular opening for releasably holding said seal ring in said operating position.

4. The sealing system defined in claim 1, wherein said seal ring is adapted to fling contaminants away from the shaft during operative rotation thereof.

5. The sealing system defined in claim 1 wherein said seal ring is adapted to be moved axially along the shaft when not in said operating position and to be retained within an annular opening within the housing, said retaining means including a snap ring device and being cooperable within a groove formed in the wall of said annular opening for releasably holding said seal ring in said operating position, and in sealing relationship with said wall.

6. The sealing system defined in claim 1 wherein the annular surface which receives the annular lip of the V-ring in sealing contact forms a portion of the housing.

7. A sealing system for a bearing having a housing with an interior chamber therein for receiving a shaft, a bearing assembly arranged in the housing and having outer and inner races extending axially relative to the shaft within the chamber, a plurality of rotatable bearing elements between the races, the housing being formed with an annular cavity having a surface extending radially inwardly toward the shaft, the sealing system comprising an annular sealing means in the form of a V-ring mounted directly on and in static sealing relationship with the shaft within the cavity and externally of the annular surface of the housing, said V-ring having an annular lip extending generally radially outwardly and seating on the annular surface for permitting egress of lubricant from the bearing assembly during purging of the assembly and to prevent ingress of foreign matter into the bearing assembly, a seal ring disposed on the shaft outwardly of the annular surface being arranged to engage said V-ring and to maintain the same whereby said lip is in sealing contact with the annular surface, and a labyrinth seal between one side of said seal ring and the annular cavity, said seal ring including a sealing member retained on another side thereof and being mounted directly on and in static sealing relationship with the shaft outwardly of said V-ring, said seal ring, sealing member and V-ring thereby being rotatable with the shaft and relative to the housing.

8. The sealing system defined in claim 7 wherein said sealing member is of the quad-ring type retained in a groove formed in the seal ring.

9. The sealing system as defined in claim 7 wherein said sealing member is an O-ring seal.

10. The sealing system defined in claim 9 wherein said seal ring is adapted to fling contaminants away from the shaft during operative rotation thereof.

11. In a shaft bearing having a housing with an interior chamber therein for receiving a shaft, a bearing assembly arranged in the housing including outer and inner races extending axially relative to the shaft within the chamber with a plurality of rotatable bearing elements between the races, the housing being formed with an internal cylindrical wall surrounding the shaft and an annular surface extending radially inwardly toward the shaft, the improvement including a sealing system having an annular sealing means in the form of a V-ring mounted directly on and in sealing relationship with the shaft externally of the annular surface of the housing, said V-ring having an annular lip extending generally radially outwardly and seating on the annular surface for permitting egress of lubricant from the bearing assembly during purging of the assembly and to prevent ingress of foreign matter into the bearing assembly, a seal ring disposed on the shaft within the cylindrical wall outwardly of the annular surface being arranged when in operating position to engage said V-ring and to maintain the same whereby said lip is in sealing contact with the annular surface, and a labyrinth seal between one side of said seal ring and the cylindrical wall, said seal ring including a sealing member mounted directly on and in static sealing relationship with the shaft outwardly of said V-ring, said seal ring, sealing member and V-ring thereby being rotatable with the shaft and relative to the housing.

12. In a shaft bearing having a housing with an interior chamber therein for receiving a shaft, a bearing assembly arranged in the housing including outer and inner races extending axially relative to the shaft within the chamber with a plurality of rotatable bearing elements between the races, and with the housing being formed with an annular surface extending generally radially inwardly toward the shaft, the improvement including a sealing system having an annular sealing means in the form of a V-ring mounted directly on and in sealing relationship with the shaft externally of the annular surface of the housing, said V-ring having having an annular lip extending generally radially outwardly and seating on an annular surface for permitting egress of lubricant from the bearing assembly during purging of the assembly and to prevent ingress of foreign matter into the bearing assembly, a seal ring disposed on the shaft outwardly of the annular surface being arranged when in operating position to engage said V-ring and to maintain the same whereby said lip is in sealing contact with the annular surface, and means for detachably retaining said seal ring in said operating position, said seal ring including a sealing member mounted directly on and in static sealing relationship with the shaft outwardly of said V-ring, said seal ring, sealing member and V-ring thereby being rotatable with the shaft and relative to the housing.

* * * * *